object, means for moving the heating element from a point outside the object into and through the hollow of the object to a point outside the object, and low reluctance means arranged at each end of the object for maintaining the inductive reactance of said heating element during the entire entrance and withdrawal movement of the latter into and from the hollow object at least substantially equal to the inductive reactance of said heating element during its presence in the hollow object.

5. Apparatus for heat-treating elongated hollow cylindrical objects of magnetic material at and near the inner surface, comprising an induction heating element arranged to be moved through the bore of the object and provided with an internal core only and arranged to have its magnetic circuit completed substantially wholly by the material of said object, and means situated at each end of the object providing a magnetic circuit conductor for the heating element adjusted to compensate for removal of the heating element partly or wholly out of the object to maintain substantially the full inductive load of the heating element.

6. Apparatus for heat-treating elongated hollow cylindrical objects of magnetic material at and near the inner surface, comprising means for holding the object to be treated, an electro-magnetic induction heating element adapted to be passed through the hollow of the object, a receptacle at each end of the object arranged to receive the heating element during its passage into and out of opposite ends of the object, means for guiding the heating element through the object from one of said receptacles to the other, means for moving said heating element in said guided path, said receptacles being formed in part of magnetic material and sealed in communication with the interior of the object to provide with the interior of the object a substantially gas tight enclosure, switching means controlling the flow of current to said heating element, gas control means controlling the supply of gas to the interior of said object and said receptacles, and control means for controlling the operation of said heating element moving means, said gas control means and said switching means in predetermined timed order.

7. Apparatus for heat treating hollow cylindrical objects at and near the inner surface, comprising an electro-magnetic induction heating element arranged to be placed within the hollow object, and a low reluctance protecting element arranged to be placed within the hollow object between the object and the heating element to lessen the heating effect of the heating element upon a given portion of the said object.

8. Apparatus for heat treating an elongated hollow cylindrical object at and near the inner surface, comprising an induction heating element less in length than the length of the inner surface to be treated, means for moving the heating element within the hollow of the object for generating heat in different portions of the object, and a low reluctance protecting element arranged to be placed within the hollow object between the hollow object and the induction element to lessen the heating effect of the heating element upon a given portion of the object.

9. Apparatus for heat treating an object having a cylindrical bore, comprising an induction heating element arranged to be moved through the bore of the object, a closure cover for one end of the bore, a bore closure piston element arranged to follow the heater element in its movement through the bore toward the closure cover, and means for maintaining an inert gas within the bore between said cover and the heating element and surrounding the heating element.

10. Apparatus for heat-treating elongated hollow cylindrical objects of magnetic material at and near the inner surface, comprising means for holding the object to be treated, an electro-magnetic induction heating element adapted to be passed through the hollow of the object, a receptacle at one end of the object arranged to receive the heating element during its passage into and out of the object, means for guiding the heating element through the object from one end to the other, means for moving said heating element in said guide path, said receptacle being formed in part of magnetic material and substantially sealed in communication with the interior of the object to provide with the interior of the object, a gas retaining enclosure, switching means controlling the flow of current to said heating element, and gas control means controlling the supply of gas to the interior of said object and said receptacle.

11. Apparatus for heat treating, at and near the inner surface, elongated hollow cylindrical objects of magnetic material having a continuous circular cross section, comprising an electro-magnetic induction heating element less in length than the length of the object to be treated, and provided with a core arranged to lie internally of the object and to have its magnetic circuit completed substantially wholly by the material of said objects, means for moving the heating element through the hollow of the object to a point outside the object, and means composed of magnetic material arranged at one end of the object to form a substantially continuous extension of the object of continuous annular cross section, into which the entire heating element may pass during the withdrawal movement of the latter.

12. Apparatus for heat treating elongated hollow cylindrical objects of magnetic material at and near the inner surface, comprising an electro-magnetic induction heating element less in length than the length of the object to be treated, and provided with a core arranged to lie internally of the object and to have its magnetic circuit completed substantially wholly by the material of said object, means for moving the heating element through the hollow of the object to a point outside the object, and means composed of magnetic material arranged at one end of the object to form with the object and the aforesaid core substantially the entire magnetic circuit of the induction heating element.

13. Apparatus for heat treating hollow cylindrical metallic objects at and near the inner surface, comprising an electro-magnetic induction heating element, means for moving the heating element through the hollow of the object to one end of the object, and means composed of material similar to the material of the object, of continuous annular cross section, and arranged to form a substantially continuous axial extension of the object.

14. Apparatus for heat treating hollow cylindrical objects of magnetic material at and near the inner surface comprising an electro-magnetic induction heating element less in length than the length of the object to be treated, and provided with a core arranged to lie internally of the object and to have its magnetic circuit completed substantially wholly by the material of said ob- INVENTOR
HAROLD L. THOMAS
BY
Herbert H. Thompson
HIS ATTORNEY July 23, 1940.  H. L. THOMAS  2,208,613
SEARCHLIGHT
Filed Dec. 23, 1937  5 Sheets-Sheet 2

INVENTOR
HAROLD L. THOMAS
BY
HIS ATTORNEY

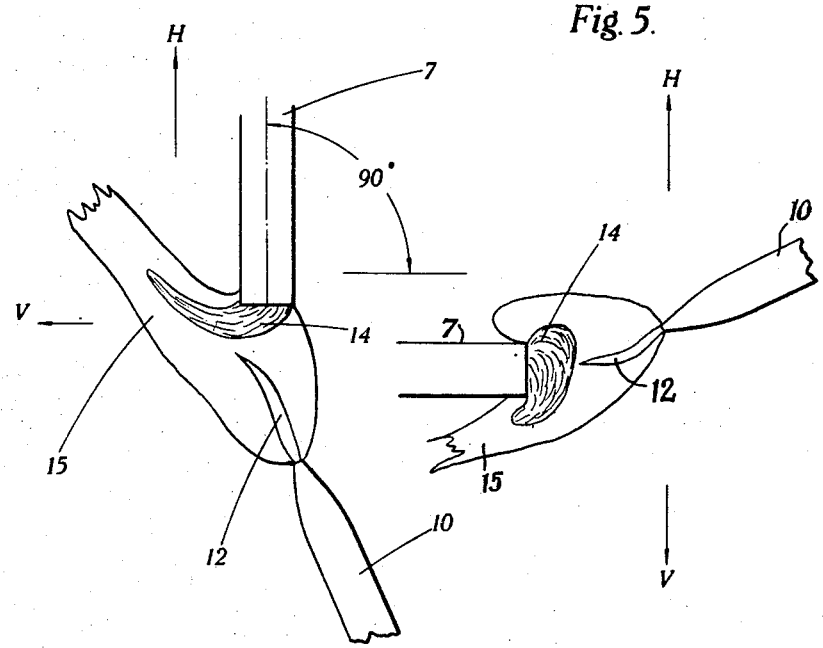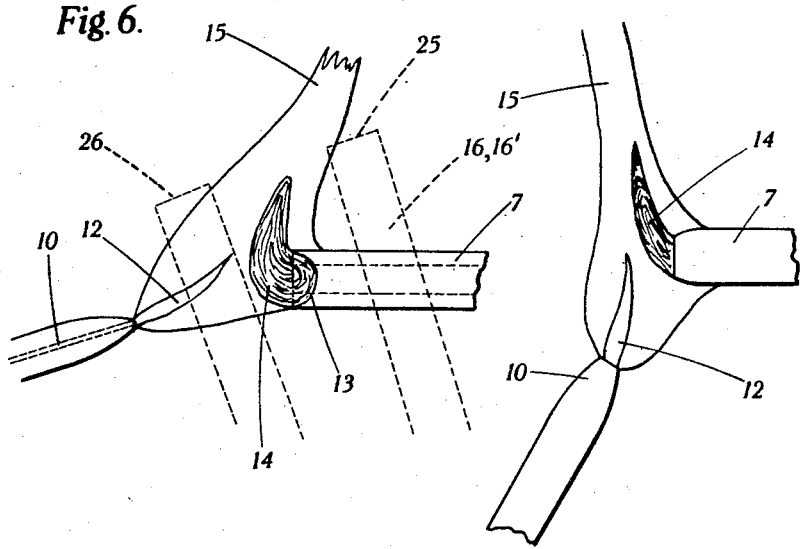

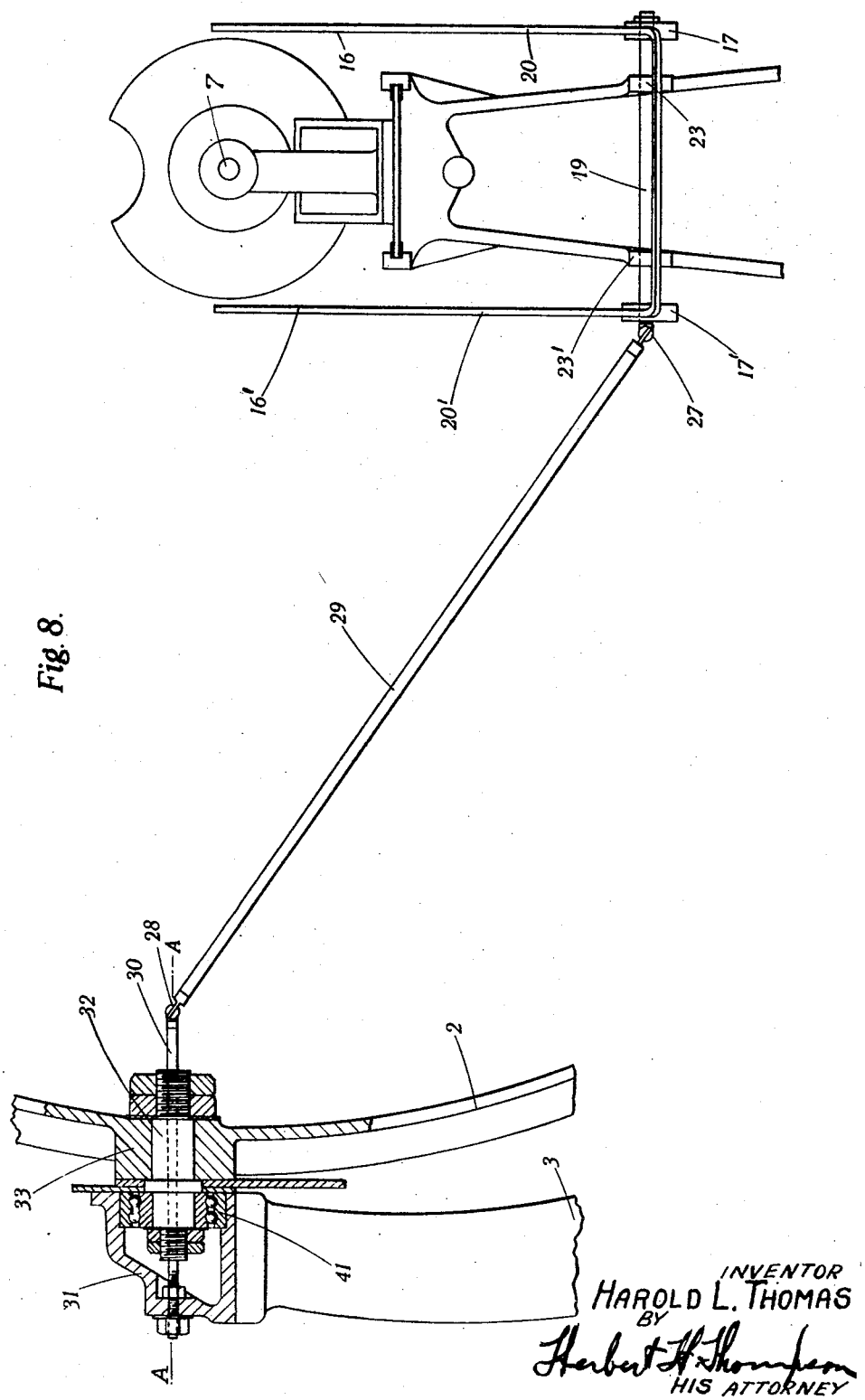

July 23, 1940.                H. L. THOMAS                2,208,613
                                SEARCHLIGHT
              Filed Dec. 23, 1937           5 Sheets-Sheet 5

INVENTOR
HAROLD L. THOMAS
BY
HIS ATTORNEY

Patented July 23, 1940

2,208,613

UNITED STATES PATENT OFFICE 2,208,613

SEARCHLIGHT

Harold Leslie Thomas, Monkseaton, Northumberland, England, assignor to Sperry Gyroscope Company Inc., Brooklyn, N. Y., a company of New York Application December 23, 1937, Serial No. 181,313
In Great Britain December 24, 1936

11 Claims. (Cl. 176—118)

This invention relates to arc searchlights adapted to be rotated about a transverse horizontal axis through large angles of the order of 90°, 180°, or even 360°.

When a searchlight of the high intensity type is tilted through large angles, particularly at elevation angles greater than 90 degrees, there are marked changes in the formation of the arc and tail flames. Such changes are due amongst other reasons to changes in the air currents due to the fact that the searchlight drum and fixed parts of the arc lamp when tilted are no longer in their original positions relative to the vertical, whereas the hot gases from the arc still tend to rise vertically.

The air currents inside the drum therefore change their paths relative to the drum and fixed parts of the arc lamp. These conditions vary with the tilt of the searchlight drum relative to the vertical, and alter the normal behaviour, formation and direction of the arc and tail flames.

The general result is that the arc becomes unstable with a consequent reduction in the light output from the searchlight.

In order to overcome this defect, we arrange that magnetic forces act on the arc streams and/or on the arc and tail flames, so as to correct their position to normal when the searchlight is tilted, and we arrange that these magnetic forces vary automatically with the angle of tilt of the searchlight.

The use of fixed magnets to apply magnetic forces to act on an arc in order to move or centralise the arc and tail flames, is well known but means for varying the magnetic forces acting on an arc have not previously been employed, nor, in particular have such magnetic forces been made to vary automatically, as the searchlight drum is tilted relative to the vertical in order to correct and restore to their normal positions the arc and tail flames of a high intensity arc lamp.

According to the present invention a magnet (or magnets) is disposed in proximity to the arc and/or the arc and tail flames and means operated by the tilting of the searchlight drum are caused to vary the position or strength of the magnet.

A more detailed description follows having reference to the drawings of which

Fig. 4 represents the arc and the tail flame when the searchlight drum is elevated through 90° about the trunnion axis.

Fig. 5 represents the arc and the tail flame when the searchlight drum is turned through a further 90° so as to be horizontal again.

Fig. 6 represents the arc and tail flame as in Fig. 3 but subjected to the influence of a control magnet.

Fig. 7 represents the arc and tail flame in an arc lamp of a different type.

Fig. 8 is an end elevation of a searchlight looking towards the mirror showing a mechanical method of varying automatically with tilt the magnetic control of the arc.

Figure 1:
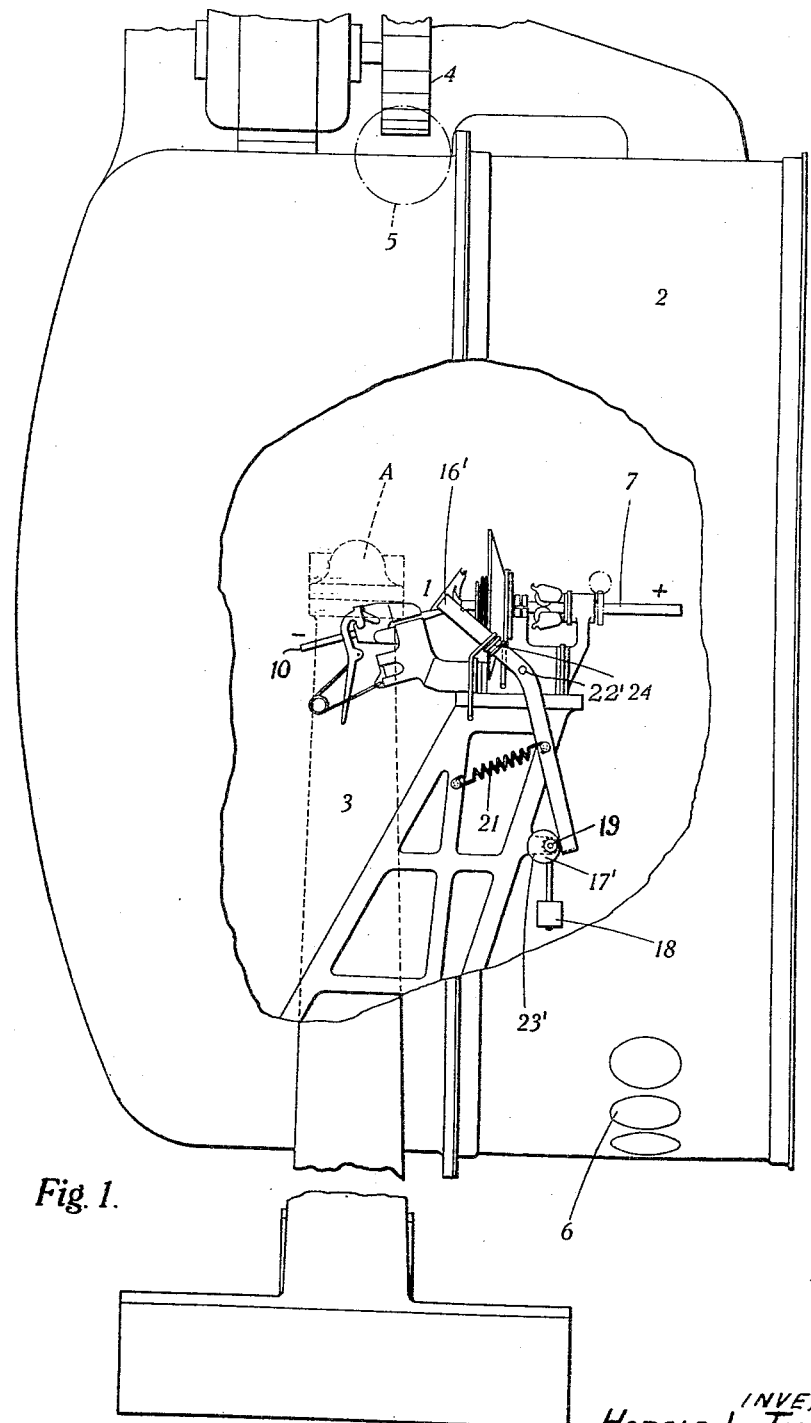
Fig. 1 is a side elevation of the drum of a high intensity searchlight, part of the drum being cut away to show the arc lamp which is provided with control magnets in accordance with the invention.

The arc 1 is located on the axis of the searchlight drum 2 which is supported by the trunnion arms 3 with freedom to tilt about the horizontal trunnion axis AA. The arc is intensely hot and hot gases rise from it into the upper part of the drum. In order to promote cooling a ventilating system is usually provided comprising a fan 4 for extracting the hot gases through ports 5 at the top of the drum and openings 6 at the bottom for admitting cool air. The fan produces a stream of air flowing from the openings 6 to the fan 4 and the position of this stream tends to remain constant relative to the drum, the direction being substantially perpendicular to the axis of the positive carbon 7 even when the drum is tilted about the trunnion axis. The heat generated by the arc 6, however, is another factor affecting the flow of air inside the drum. This heat tends to maintain a flow of air from the arc in a vertically upwards direction irrespective of the angle of tilt of the drum, and the actual air flow at any time may be considered as the resultant of or a compromise of these two separate streams.

Figure 3:
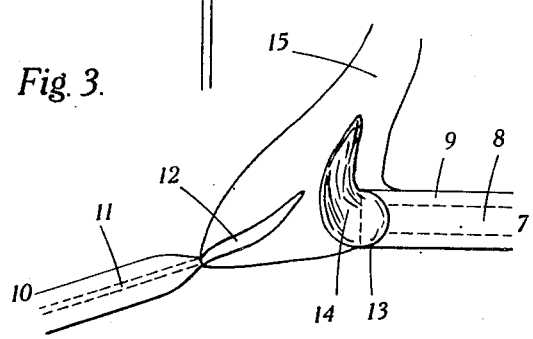
Fig. 3 represents the arc and the tail flame when the searchlight drum is horizontal.
Figure 9:
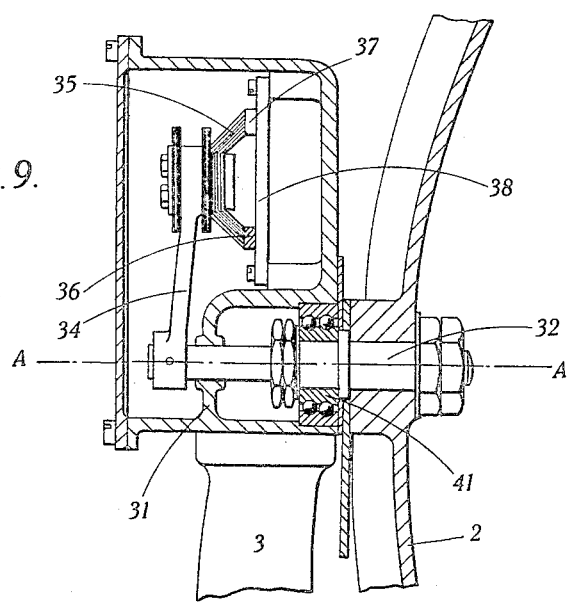
Fig. 9 is an end elevation of part of a searchlight drum and a trunnion arm showing an electrical method of obtaining automatic variation of the magnetic control of the arc.
Figure 10:
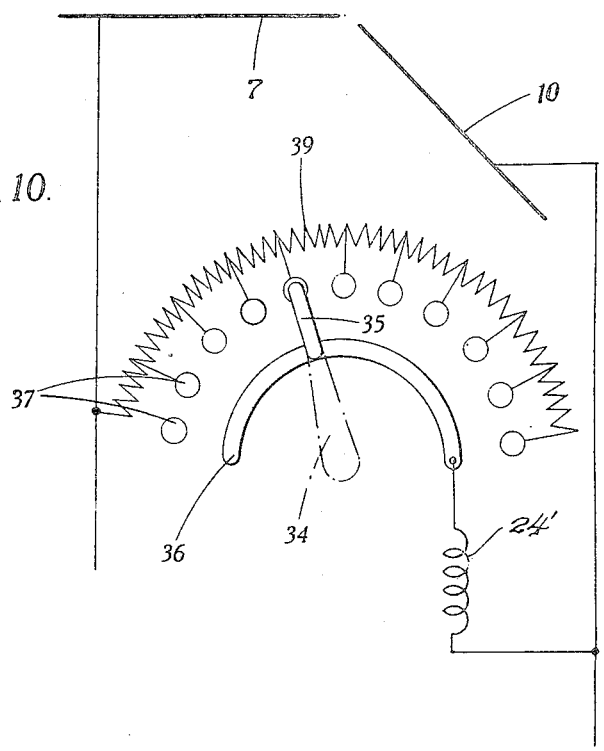
Fig. 10 is a diagram of the electric circuit arrangements used in connection with the form of the invention shown in Fig. 9.

The direction of the two component streams, regarded as separately existing, is shown in Figs. 3, 4 and 5, Fig. 3 corresponding to the normal horizontal position or zero-position of the drum 2, Fig. 4 corresponding to one in which the drum is elevated through 90° and Fig. 5 corresponding to one in which the drum has been rotated through 180° from its normal position. The stream due to the forced ventilation is in all cases shown by the arrow V and that due to the heat of the arc by the arrow H.

When the drum is in the horizontal position shown in Fig. 3 the two air streams coincide, but when the drum is tilted about the horizontal trunnion axis the two air streams cease to coincide. At an elevation of 90° as shown in Fig. 4 the air stream V is practically horizontal while the stream H is directed vertically away from the mirror.

When the drum is 180° from its original position (as shown in Fig. 5) the two air streams V and H oppose one another. If the drum is turned through 270° the air stream V, due to the ventilating fan, once again becomes horizontal but the air stream H will be directed vertically towards the mirror. In all cases the resultant air flow lies in a direction between those of its two component streams; its direction changes considerably as the drum is rotated about its trunnion axis.

A high intensity carbon arc such as is used in searchlights is shown in Fig. 3 in normal operation as when the drum is horizontal. The positive electrode has a core 8 consisting of rare earths encased in a carbon shell 9 and the negative 10 has a small diameter core 11 of soft carbon.

Such an arc exhibits a negative core flame 12 which sweeps across the positive crater 13 imprisoning therein the gas ball 14 which is the main source of light. A tail flame 15 is also present. It is essential to the correct operation of the arc that the negative core flame 12 shall sweep the crater 13 in such a way that it exerts pressure on the gas ball 14, and to this end the axis of the negative electrode 10 is usually arranged to meet the face of the positive crater 13 at a point slightly below the axis of the positive electrode 7. The negative core flame 12 then exerts pressure on the gas ball 14 and imprisons it in a satisfactory manner. If, however, the drum 1 be tilted upwards (i. e. in the sense of the arrow) through 90° about the trunnion axis AA, the arc conditions become those shown in Fig. 4. The negative core flame 12 then impinges too directly on the gas ball 14 and, instead of imprisoning it, tends to make it spill out round the edge of the crater. The tail flame 15 moves closer to the axis of the positive carbon 7 since the heat of the arc tends to produce a vertically rising stream. The tail flame licks the positive electrode 7, and may cause damage to flame shields and possibly even to mechanism on the positive head.

In searchlights in which the position of the negative carbon is governed by the arc voltage a further disadvantage becomes evident. As the negative core flame now impinges directly into the positive crater instead of sweeping over it as in Fig. 3, the effective arc length is decreased and hence the arc voltage falls. The negative feed control, which is operated by the arc voltage, consequently allows the arc gap to lengthen to restore the arc voltage but owing to the increased length of the arc gap the negative core flame 12 loses some of its directive force and ceases to exert pressure on the gas ball 14, so that much of the gas escapes. These effects combine to make the arc unstable and to make the light output fall rapidly until it reaches a value about half of the normal figure.

Further tilting of the drum increases this tendency to instability irrespective of whether or not the position of the carbons is controlled by the arc voltage, until after the drum has been moved through 180° and is again horizontal but upside down as in Fig. 5. In this position the positive gas ball 14 tends to spread out like a mushroom all round the crater.

It is obviously of the utmost importance that the negative core flame should be correctly controlled and directed at all times and it is the object of this invention to provide such controlling and directing means.

It is known that if a magnetic pole is brought into the proximity of the arc, the behaviour of the arc is profoundly affected.

According to the invention, means are provided for automatically varying the position and/or strength of magnetic poles in the proximity of the arc as the drum is tilted so as to counteract the previously described effects produced by tilting the searchlight drum.

Figure 2:
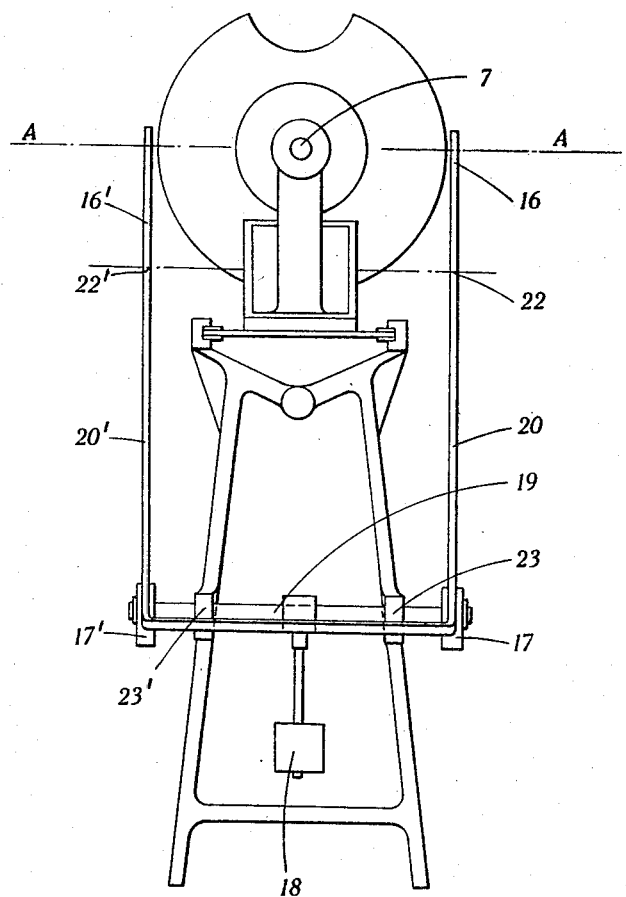
Fig. 2 is an end elevation of the arc lamp looking towards the mirror.

One method of carrying the invention into effect is shown in Figs. 1 and 2; a magnet 16, 20, 20', 16' is pivoted at 22, 22' so that its poles 16, 16' lie adjacent to and on opposite sides of the arc. In this form of the invention the poles are of constant strength and the variable effect of the magnets on the arc is obtained by tilting the magnet assembly about its pivots 22, 22' so as to vary the position of the poles 16, 16' in relation to the arc. For this purpose the magnet assembly is placed under the influence of a spring or springs 21 thus keeping the arms 20, 20' in contact with the surfaces of cams 17, 17', and means are provided for automatically rotating the cams relatively to the searchlight drum 1 as the latter is rotated about the trunnion axis AA. The cam surfaces are so designed as to produce the requisite amount of tilting of the magnet assembly 20, 20' about the pivots 22, 22' to move the poles 16, 16' sufficiently to compensate for the undesired effects on the tail flame of tilt of the searchlight drum.

The magnet 20, 20' may either be of the permanently magnetized variety, or it may be an electro-magnet as shown, the energizing coils 24, 24' being either series, shunt or compound wound.

The polarity of the magnet used depends upon the angle between the electrode axes. In the case of the lamp illustrated in Figs. 1, 2, 3, 4, 5, the angle is about 15° and the magnet is arranged so that 16 is the north pole. The flux is therefore directed from right to left in Fig. 2 and, under the influence of this flux, the tail flame 15 assumes a position nearer to the vertical than that shown in Fig. 3 while the negative core flame 12 is bent upwards as shown in Fig. 6. The arc gap under these conditions is shorter than that obtained without magnetic control.

By moving the magnets 16, 16' from the position 25 to position 26 the effect of the magnetic control will be increased, the tail flame 15 will bend further and further towards the negative electrode 10, the negative core flame 12 will curl more and more upwards, and the arc gap will become shorter and shorter. Thus magnetic control exerts an effect almost directly opposite to that produced by tilting the drum so that these two effects can be made to balance one another if the amount of magnetic control is made the correct function of the degree of tilt of the drum.